Figure 1:
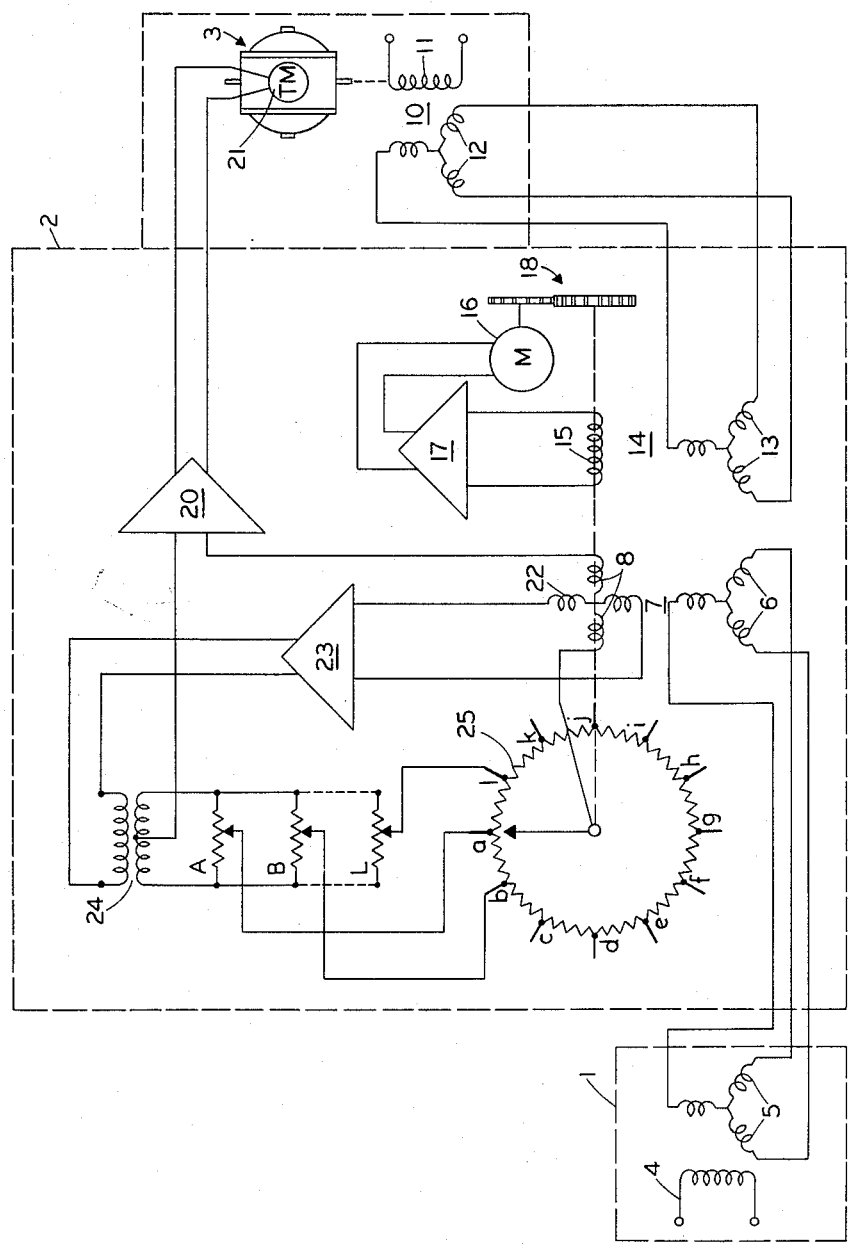

Nov. 15, 1960  E. F. BOOSE  2,959,865
ELECTRICAL ERROR COMPENSATION ARRANGEMENTS
Filed Dec. 31, 1956  2 Sheets-Sheet 1

Inventor:
Emery F. Boose
by Richard E. Horley
His Attorney

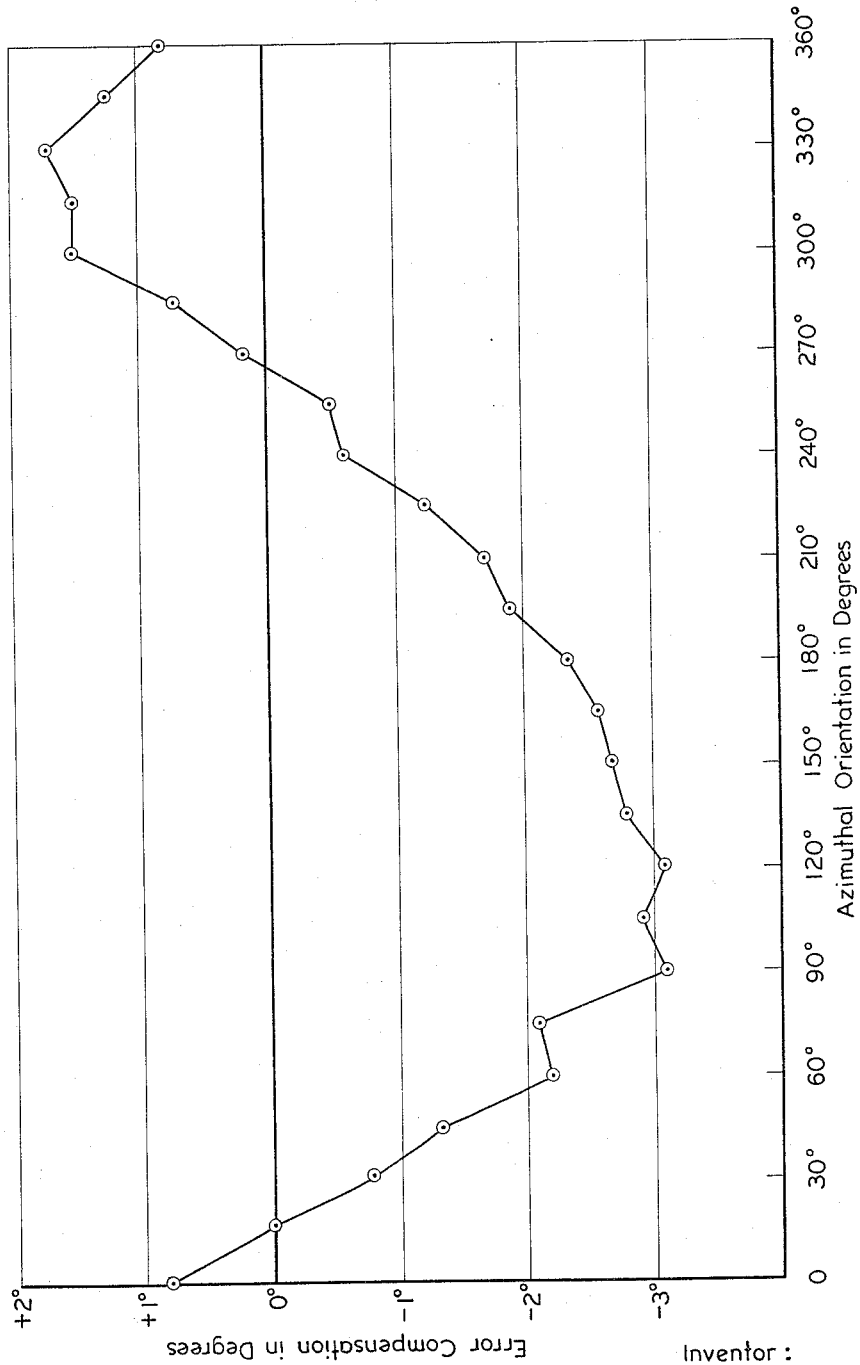

United States Patent Office 2,959,865
Patented Nov. 15, 1960

2,959,865

ELECTRICAL ERROR COMPENSATION ARRANGEMENTS

Emery F. Boose, Georgetown, Mass., assignor to General Electric Company, a corporation of New York Filed Dec. 31, 1956, Ser. No. 631,737

3 Claims. (Cl. 33—224)

The present invention relates to arrangements for minimizing errors in electro-mechanical telemetering and control systems. Particularly, this invention is concerned with apparatus which automatically compensates for errors of both mechanical and electrical origin in systems wherein the positions of a movable member represent intelligence.

As will appear more fully hereinafter, the improved deviation compensator which is the subject of this disclosure is an electro-mechanical device wherein an output signal of a desired one of two opposite phases and of a desired amplitude may be secured when a movable member is oriented at any one of a multitude of predetermined positions. The compensator is utilized with particular advantage in systems wherein electrical signals control the angular positions of a rotatable member and wherein, because of errors of both electrical and mechanical origin contributing to errors in the orientations of the rotatable member, it is beneficial to inject into the system at an appropriate place signals of a precise phase and magnitude to compensate for erroneous deviations by causing further angular orientations of the rotatable member which align that member with the theoretically correct positions. Detailed arrangements embodying error or deviation compensators of the same general character for similar purposes may be observed with reference to the patent of John E. Lundberg et al. for a Deviation Compensator, Number 2,519,058, issued on August 15, 1950, the patent to John E. Lundberg et al. for an Error Compensator, Number 2,570,826, issued on October 9, 1951, and the patent to Donald W. Halfhill for a Deviation Compensator, Number 2,652,545, issued September 15, 1953, each of which is assigned to the same assignee as that of the present invention.

The subject compensator arrangement, in contradistinction to those described in the above-mentioned patents, operates on a potentiometric basis. That is, the movable contact of a master potentiometer is caused to derive varying potentials from different points upon a potentiometer. The potentials so derived are supplied to a number of fixed contact points upon the master potentiometer from a series of lesser potentiometers each of which is supplied from the same reference signal source. As each position of the movable contact on the master potentiometer corresponds to a position assumed by a rotatable member, an adjustable error compensating signal is derived which may be employed to compensate for erroneous deviations of the rotatable member. This novel arrangement possesses several distinct advantages, not the least of which is that the wave shape of the signal applied to it is unaltered by the compensator.

It is, accordingly, a general object of this invention to provide improved electrical error compensation for telemetering systems in which an electrical signal controls the orientation of a movable member.

An important application of the present invention is in the field of directional indicator systems in which the orientation of a rotatable member such as a gyroscope is controlled by signals received from a compass transmitting unit. An error compensating signal produced by a form of this invention may be inserted at an appropriate place in the directional system to correct for deviations of the rotatable member from its correct position.

A specific object of this invention is therefore to provide improved electrical error compensation for directional systems controlled by a compass transmitter.

Although certain aspects of this invention are applicable to many types of telemetering applications, I have elected to describe the invention as embodied in the improved error-compensated gyrocompass system shown in the accompanying Figure 1.

Figure 2 is a curve representing a typical error compensating effect which may be achieved by the use of the present invention.

In the accompanying Figure 1 there may be seen an earth-inductor type compass transmitter 1 which, through the control means 2, governs the azimuthal orientation of directional gyroscope 3. In the preferred arrangement shown, an excitation winding 4, usually energized by a 400-cycle potential, periodically saturates a magnetic core structure, not shown, to cause the earth's field to produce a second harmonic pattern of signals in the polyphase-connected windings 5. Because the compass transmitter is normally positioned horizontally, the pattern of signals so produced is related to and characterizes the direction and strength of the horizontal component of the earth's magnetic field. This pattern of signals is repeated across polyphase-connected windings 6 of compass detector synchro 7. Rotor winding 8 within synchro 7 is so arranged with respect to windings 6 that it derives therefrom a phase- and amplitude-characterized control signal whenever it is caused to depart in one direction or the other from a predetermined orientation with respect to the pattern of potentials existing in windings 6. It is to be understood that if the compass transmitter 1 is caused to rotate in azimuth, a condition obtaining when it is carried by a movable craft in a turn, the field produced by the pattern of signals in windings 5 and 6 will shift. But as long as rotor winding 8 moves during turns and retains its position relative to the shifting field, no control signal will be induced therein.

Actually the signal rotor 8 is caused to follow the movements of the directional gyroscope 3 by servo means to be described below and the control signal is used to slave the gyroscope to a particular azimuthal orientation in a sort of mutual interdependence. Although the slaving and servo positioning means by which the latter purposes may be accomplished should be familiar to those skilled in the art, their functioning will here be described in order to aid in a proper appreciation of my invention and to clarify certain important relationships between elements of the system.

I prefer to provide the directional gyroscope with a position transmitter unit 10 which includes a rotor winding 11 excited from an alternating current source, and arranged to rotate in azimuth with the gyro rotor about its output axis. The transmitter unit also includes stator windings 12 which sense the position of rotor windings 11 and transmit signals characterizing its orientation to the stator windings 13 of a servo detector synchro 14. The latter detector synchro includes a rotor winding 15 which produces a phase- and amplitude-characterized signal whenever its position does not correspond to that of the gyro. This signal serves to control reversible motor 16 through servo amplifier 17 so that through a gearing arrangement 18 the rotor winding 15 is driven back into positional correspondence with the gyro. When the positions of the directional gyro and rotor winding 15 exactly coincide, no signal is picked up by the rotor winding. It is therefore said to be at a null position. Relative movement of the gyro with respect to the craft on which it is mounted, such as would occur during a turn of the craft or during precessional movements of the gyro rotor structure, will cause the rotor 15 to follow the movements of the gyro. Furthermore, because of the mechanical connection shown in dotted lines between this rotor and rotor winding 8, rotor 8 will also repeat the position of the gyroscope. In so doing, rotor winding 8 will derive a phase- and amplitude-characterized control signal in the manner described above whenever the gyroscope departs from a predetermined orientation with respect to the earth's magnetic field. This control signal when applied to amplifier 20 governs torque motor 21 to cause precessional movements of the gyro in the proper direction to return the gyroscope to its predetermined orientation.

As previously indicated, turning of the craft on which this system is mounted will be accompanied by a rotation of the field in detector synchro 7. Turning of the craft will also be accompanied by relative rotation of the gyroscope to maintain its position in azimuth, and the servo system described above serves to maintain rotor winding 8 in a null position within compass synchro detector 7.

A copending application in the name of Lewis T. Seaman for "Error Compensated Directional Systems," Ser. No. 631,738, filed of even date herewith and assigned to the same assignee as that of the present application, discloses it to be desirable in a directional system of this nature to derive a reference signal proportional in amplitude to the gradient of the control signal from rotor winding 8, this gradient being the amplitude of the control signal per unit angular deviation from the null position. This reference signal may then be converted into an error compensating signal by adjustably altering its amplitude by predetermined ratios at each of a plurality of intervals corresponding to every few degrees of azimuthal orientation of the directional system. As is more fully set forth in the aforesaid copending application, when the resulting error compensation signal is combined with a control signal such as that produced by rotor winding 8, significant advantages are accrued. The control signal produced by rotor winding 8 at any given angular deviation from its null position is dependent upon the strength of the earth's local magnetic field and upon a number of other variable factors such as temperature and excitation voltage. An error compensating signal which is affected to the same extent by these variable factors is capable of effecting a constant angular correction at each azimuthal heading of the craft carrying the directional system. As a means for deriving a reference signal having the desired proportionality, the Seaman application suggests the provision of an additional compass detector synchro having a rotor winding normally oriented to derive a maximum reference signal. In the nature of a specices improvement on the invention described and generically claimed in the above mentioned application, I have found it desirable to combine both compass detector synchros into a single unit with a single set of stator windings, but with a pair of rotor windings therein arranged in space quadrature to one another. This arrangement results in a decrease in the loading on compass transmitter 1 and hence a reduction in the power requirements of the system. Additionally, such an installation is naturally less expensive because of fewer parts and because the relative orientations of the two rotor windings may be fixed at an early stage of manufacture.

In Figure 1 I have shown rotor winding 22 at right angles to winding 8 for deriving a maximum reference signal proportional in amplitude to the control signal gradient from the flux pattern set up in synchro 7. Other angles between windings 8 and 22 may be selected to provide a reference signal having the desired proportionality, but the space quadrature position results in the derivation of a maximum amplitude reference potential which is least susceptible to variation when rotor winding 8 is not quite at null position.

In the conversion of the reference signal into an error compensation signal, it is important to so modulate its intensity, and in some instances to alter its phase, that different preselected amounts of error compensation may be provided at each of a number of preselected headings of the craft carrying the directional system, since the amount of error in the system is usually not the same at each heading. In order to provide an electrical function generator to serve this purpose, I have devised a unique error compensator arrangement into which the reference signal may be introduced through a linear isolation amplifier 23, if desired, to minimize loading of synchro 7, so that the reference signal appears across the center-tapped secondary winding of transformer 24. The reference signal, therefore, appears across each of the potentiometers labeled A–L, some of which have been omitted for clarity as indicated by the dotted circuit connections. Each of the fixed multiple contacts on master potentiometer 25 is connected to a movable contact on one of the potentiometers A–L, while the adjustable contact of the master potentiometer is connected in series with rotor winding 8. By virtue of the center-tapped connection on the secondary winding of transformer 24, each of the potentiometers A–L may be individually adjusted to provide correctly phased predetermined amounts of reference potential to each of the fixed contacts on the master potentiometer. Because the adjustable contact of the master potentiometer is mechanically connected with rotor windings 8 and 22 to follow the azimuthal movements of the gyroscope, in its movements from point to point about the potentiometer, it will derive an error compensating signal which is a function of heading.

The shape of the error compensation curve may easily be varied to suit the needs of any given installation by appropriate adjustment of each of the potentiometers A–L. An example of a typical error compensation curve which may be achieved by the use of this system is shown in the graph of Figure 2 wherein the abscissa indicates azimuthal orientation of the system in degrees and the ordinate represents in degrees the amount of error compensation achieved. As can readily be seen, the resulting error correction curve has the advantage of providing a smooth, straight-line slope between compensation points, making it possible to correct for virtually any combination of errors, whether electrical or mechanical in derivation. This curve has been derived from a system having fixed contact points on the master potentiometer 15° apart instead of 30° apart as shown in Figure 1. Naturally, the greater the number of fixed contacts on the master potentiometer which are provided with adjustable potentials, the smoother will be the resulting error compensation curve. It will be observed that by means of this system it is possible to provide sharp changes in the amount of error compensation from point to point in azimuth, a result which is not possible with prior mechanical deviation compensation arrangements. Furthermore, most electrical compensation arrangements are incapable of providing a smooth, straight-line slope between compensation points. Instead, such error compensation arrangements as have been achieved in the past ordinarily result in providing area-to-area compensation instead of point-to-point compensation. That is to say, in electrical systems which have provided error compensation at 15° intervals, the amount of error compensation developed has been relatively constant over the entire 15° interval.

In the application presently described, this error compensator arrangement is particularly useful because the wave form of the reference potential developed in rotor winding 22 remains substantially unaltered in the process of having its amplitude altered. The effect is that the error compensating signal has the same wave form as the control signal from rotor winding 8 with which it is combined, a result which contributes to the reduction of the noise level in the system. The advantage of compensating for errors in the system with an error compensating signal having substantially the same wave form as the control signal is one which will immediately be appreciated by those skilled in the art to which the invention pertains. The present error compensator arrangement has additional advantages which include a simplified mechanical arrangement resulting in significant cost reduction over prior compensators. As a further feature it should be mentioned that, because arrangements constructed in accordance with this invention operate on potentiometric principles instead of by flux transfer methods, they are not restricted in their use to alternating current systems but may be applied with equal advantage to direct current operations.

While I have preferred to describe my invention as embodied in a particular directional system, it will be apparent that the invention is not limited to the exact system identified and that certain aspects of the invention are applicable to other types of position telemetering systems wherein a movable member is to be positioned in accordance with a measurable condition. In addition, certain alterations may be made in the form of the impedance elements utilized in the practice of this invention. The master potentiometer, for example, need not be circular in shape but could be linear as well, and its adjustable contact may be positionable by any movable member, whether rotary or not, in accordance with a variable condition. Thus, a fair interpretation of the appended claims will undoubtedly include within their scope numerous modifications, substitutions and other variations which will occur to those skilled in the art to which this invention pertains.

What I claim as new and desire to secure by Letters Patent of the United States is:

1. An error compensated directional system for movable craft comprising: a directional gyroscope; means for precessing said gyroscoype in azimuth; compass transmitting means generating a signal varying with the direction of the earth's magnetic field; a detector synchro connected to receive said signal; a null rotor winding in said synchro positioned by said gyroscope to produce a phase-and amplitude-characterized control signal upon departure of said gyroscope from a predetermined azimuthal orientation; a second rotor winding in said synchro positioned by said gyroscope to produce at all times a reference signal proportional in amplitude to the gradient of said control signal; means adjustably altering the amplitude of said reference signal by a fixed preselected ratio at each of a plurality of preselected headings of said craft to produce an error compensating signal which is a function of azimuthal heading; and means controlling said precessing means in accordance with said control signal and said error compensating signal.

2. An error compensated directional system for movable craft comprising: a directional gyroscope; means for precessing said gyroscope in azimuth; compass transmitting means generating electrical signals varying with the direction of the earth's magnetic field; a detector synchro connected to receive said signals and to produce a periodically varying magnetic field having a direction dependent on the horizontal component of the earth's magnetic field, said synchro having a null rotor winding positioned in said periodically varying magnetic field by said gyroscope to produce a phase- and amplitude-characterized control signal upon departure of said gyroscope from a predetermined azimuthal orientation and a second rotor winding positioned in said periodically varying field by said gyroscope to produce a reference signal proportional in amplitude to the gradient of said control signal; means adjustably altering the amplitude of said reference signal by a fixed preselected ratio at each of a plurality of headings of said craft to produce an error compensating signal which is a function of the heading of said craft; and means controlling said precessing means in accordance with said control signal and said error compensating signal.

3. An error compensated directional system for movable craft comprising: a directional gyroscope; means for precessing said gyroscope in azimuth; compass transmitting means generating a signal varying with the direction of the earth's magnetic field; a detector synchro connected to receive said signal; a null rotor winding in said synchro positioned by said gyroscope to produce a phase-and-amplitude-characterized control signal upon departure of said gyroscope from a predetermined azimuthal orientation; a second rotor winding in said synchro positioned by said gyroscope to produce at all times a reference signal proportional in amplitude to the gradient of said control signal; a master potentiometer having an adjustable contact and a plurality of fixed contacts; means applying preselected amounts of said reference potential to each of said fixed contacts; means positioning said adjustable contact in accordance with the azimuthal orientation of said gyroscope, whereby an error compensating signal which is a function of azimuthal heading appears at said adjustable contact; and means controlling said precessing means in accordance with said control and error compensating signals.

References Cited in the file of this patent

UNITED STATES PATENTS

| | | |
|---|---|---|
| 2,459,830 | McCarthy | Jan. 25, 1949 |
| 2,581,428 | McCarthy | Jan. 8, 1952 |
| 2,760,146 | Wilentchik | Aug. 21, 1956 |
| 2,762,959 | Welch | Sept. 11, 1956 |